United States Patent [19]

Ju et al.

[11] Patent Number: 5,375,023
[45] Date of Patent: Dec. 20, 1994

[54] SUBMICRON THIN FILM INDUCTIVE HEAD WITH SELF-ALIGNED STAGGERED POLE-TIPS

[75] Inventors: Kochan Ju; Mohamad T. Krounbi; Po-Kang Wang, all of San Jose, Calif.

[73] Assignee: International Business Machines Corporation, Armonk, N.Y.

[21] Appl. No.: 998,171

[22] Filed: Dec. 29, 1992

[51] Int. Cl.$^5$ .................. G11B 5/23; G11B 5/127; G11B 5/147

[52] U.S. Cl. .................. 360/119; 360/125; 360/126

[58] Field of Search .............. 360/119, 121, 125, 103, 360/104, 119, 121, 125, 103, 104, 126

[56] References Cited

U.S. PATENT DOCUMENTS

| | | | |
|---|---|---|---|
| 2,961,495 | 11/1960 | Wallen | 179/100.2 |
| 3,384,881 | 5/1968 | Frost et al. | 340/174.1 |
| 3,700,827 | 10/1972 | Nagao | 179/100 |
| 4,085,430 | 4/1978 | Gerkema et al. | 360/119 |
| 4,651,249 | 3/1987 | Bril et al. | 360/119 |
| 4,695,908 | 9/1987 | Imakoshi et al. | 360/119 |
| 4,729,050 | 3/1988 | Koyama | 360/119 |
| 4,807,076 | 2/1989 | Nakashima et al. | 360/126 |
| 5,089,334 | 2/1992 | Mallary et al. | 360/119 |
| 5,229,904 | 7/1993 | Ito et al. | 360/125 |
| 5,283,942 | 2/1994 | Chen et al. | 360/125 |
| 5,296,993 | 3/1994 | Aboaf et al. | 360/126 |

FOREIGN PATENT DOCUMENTS

| | | | |
|---|---|---|---|
| 73016 | 6/1979 | Japan | 360/119 |
| 32765 | 2/1988 | Japan | 360/119 |
| 71906 | 4/1988 | Japan | 360/119 |

OTHER PUBLICATIONS

"Thin Film Head With Staggered Pole Tips", by Wang et al, IEEE Transactions on Magnetics, vol. 27, No. 6, Nov. 1991, pp. 4710–4712.

*Primary Examiner*—A. J. Heinz
*Assistant Examiner*—Allen Cao
*Attorney, Agent, or Firm*—Baker, Maxham, Jester & Meador

[57] ABSTRACT

A thin film inductive head having staggered pole-tips with a self-aligned recording gap region. The recording gap region is bounded by stepped pole-tip element with the steps made large with respect to the gap thickness. The pole-tip layers extend back from the air bearing surface to form a throat region that is also large with respect to the gap thickness. The self-aligned staggered pole-tip geometry is suitable for submicron track widths because the pole-tips may themselves be much wider and the self-aligned configuration avoids submicron masking and registration difficulties. The stepped pole-tip surfaces also eliminate the side-writing problem known in the art for overlapping thin film poles.

20 Claims, 5 Drawing Sheets

SUBMICRON THIN FILM INDUCTIVE HEAD WITH SELF-ALIGNED STAGGERED POLE-TIPS

CROSS-REFERENCES TO RELATED APPLICATIONS

Copending application entitled "Sacrificial Layer Planarization Process For Fabricating A Narrow Thin Film Inductive Head" (Assignee Docket No. SA9-91-107) filed on even date herewith as application Ser. No. 998,085 is incorporated herein in its entirety by this reference. Copending application entitled "Thin Film Planarization Process For Fabricating Magnetic Heads Employing A Stitched Pole Structure" (Assignee Docket No. SA9-92-035) filed on even date herewith as application Ser. No. 998,173 is incorporated herein in its entirety by this reference. These copending applications are related to this application through common inventorship.

BACKGROUND OF THE INVENTION

1. Field of the Invention

This invention relates generally to thin film magnetic heads for high density data storage devices and, more specifically, to a self-aligned staggered-pole inductive head with a submicron track width.

2. Discussion of the Related Art

Thin film magnetic read/write heads are used for reading and writing magnetically coded data stored on a magnetic storage medium such as a magnetic disk or magnetic tape. There is a continuing strongly-felt need for increasing the data storage density in such media. Most efforts to increase magnetic data storage density involve techniques for increasing the areal bit density in the magnetic medium.

In rotating magnetic disk drives, the areal density is equivalent to the product of the number of flux reversals per millimeter and the number to tracks available per millimeter of disk radius. Thus, high areal data storage density requires recording heads with high linear resolution and narrow track-width. The linear resolution of a two-pole inductive head is related to the gap between the pole-tips at the air bearing surface (ABS). In the present art, submicron gaps are commonly available. Recent improvements in magnetoresistive (MR) sensor fabrication have led to development of the dual element head, which combines MR read and inductive write elements. This dual element approach solves the low read-back signal sensitivity problem associated with narrow inductive heads. Thus, increased linear recording density is now obtainable without incurring an unacceptable penalty in lost read signal sensitivity.

In pushing the areal density limit in magnetic recording using the dual MR-inductive element approach, the problems associated with fabricating narrow-track inductive write heads are now more limiting than the problems associated with fabricating narrow-track MR read heads. Experimental and mathematical modeling results confirm that further substantial increases in areal recording density must come from reductions in track width rather than from increases in linear flux transition densities in the recording media.

The major barrier to narrower track widths imposed by conventional thin film inductive head fabrication techniques is the topographical variation confronted when defining the upper pole-tip width. Because of varied topography, conventional thin film techniques require the narrow upper pole-tip to be deposited at the bottom of a 15–18 micron photoresist groove. Unreliable results are well-known for attempted deposition of a layer width of one to three microns at the bottom of a 15–20 micron groove depth. Several new pole-tip fabrication approaches have been proposed to address this problem.

Some practitioners avoid the track-width limitations of extreme topography by defining the upper pole-tip immediately following the deposition of the insulating material defining the recording gap. For instance, T. Kawabe, et al ("Fabrication of Thin Film Inductive Heads With Top Core Separated Structure", *IEEE Transactions on Magnetics*, Vol. 27, No. 6, November 1991, pp. 4936–4938) discusses a pole-tip stitching method where the pole-tip is formed earlier in the fabrication process where a thinner photoresist pattern can be used as a mask for the pole-tip.

Another approach is the overlapping or "staggered" pole-tip magnetic head design, which forms the narrow track width at the overlap of two wider pole-tips. Although the "staggered" head concept avoids the problems associated with fabricating pole-tips less than three microns wide, existing designs are subject to unacceptable side-writing effects at the "wrap-around" region 10 of the gap (FIG. 2). As used herein, a staggered pole head means any head design employing overlapping pole-tips to define a recording gap narrower than the pole-tips.

A ferrite head with overlapping poles that define the track width at the overlap (FIG. 1) was first suggested by D. L. Wallen in U.S. Pat. No. 2,961,495. Somewhat later, W. T. Frost, et al improved on this concept in U.S. Pat. No. 3,384,881. In both cases, the inventors showed how to make narrow track-widths without making small pole-tips. Neither practitioner suggests that a method for pole-tip alignment at the gap regions, however, and neither taught thin film applications.

A thin film version of the staggered pole-tip concept was first disclosed by Morimasa Nagao in U.S. Pat. No. 3,700,827. However, Nagao's design (FIG. 2) is not useful for modern applications because the upper pole $P_2$ wraps around the lower pole $P_1$, creating side-writing problems in wrap region 10 (FIG. 2).

Po-Kang Wang, et al ("Thin Film Head With Staggered Pole-tips", *IEEE Transactions on Magnetics*, Vol. 27, No. 6, November 1991, pp. 4710–4712) propose two staggered pole-tip configurations (FIGS. 3 and 4) for thin film inductive heads. The configuration in FIG. 3 is similar to a conventional thin film head except for the oversized pole-tips. The configuration in FIG. 4 differs significantly from the conventional head because the flux is conducted to the track region in a path that is parallel to the ABS. Wang, et al report that both configurations should be suitable for narrow track applications but they found that process variations reduced fabrication yields of staggered pole-tips in the transverse configuration and they were unable to obtain any significant yield of submicron track-widths in the longitudinal configuration. These problems were said to be related to the fabrication process.

FIG. 5 illustrates a typical planarization method known in the art for fabricating staggered pole-tips. FIG. 5A shows the deposition of the lower pole $P_1$ element 12. FIG. 5B shows a nonmagnetic insulating layer 14 deposited over $P_1$ layer 12. FIG. 5C shows the planarized lower pole assembly after removal of the excess material in FIG. 5B. In FIG. 5D, a gap-forming layer 16 is deposited on top of the planarized $P_1$ layer 12. Finally, the upper pole $P_2$ layer 18 is deposited to form the overlapping gap in FIG. 5D. While the Wang, et al designs (FIGS. 3 and 4) significantly improve the side-writing problem over Nagao's design (FIG. 2), more improvement is needed for submicron track applications. Further improvement can be obtained by using self-aligned pole-tips of the same width in the receding gap region at the ABS.

Until now, a staggered-pole inductive head with self-aligning pole-tips was unknown in the art. Because of the clearly-felt need for submicron track widths, the related unresolved problems and deficiencies are clearly felt in the art and are solved by this invention in the manner described below.

SUMMARY OF THE INVENTION

This invention solves the problem of pole-tip alignment in a staggered-pole head by introducing a step in each of the two thin film pole-tip layers at the edges of the gap region. Thus, the gap region of self-aligning $P_1$ and $P_2$ is bounded by the steps. The step distances should be large relative to the gap thickness. The two steps need not necessarily be equal, but each should be at least two to three times the gap thickness.

It is an object of this invention to provide a thin film self-aligned staggered-pole magnetic head design suitable for use in submicron track width applications. It is an advantage of this invention that the stepped pole-tip layers provide the necessary self-alignment without either numerous or unusual thin film fabrication procedures.

The pole-tip steps need not extend very far into the head from the air bearing surface (ABS) but the distance that the steps extend into the head from the ABS should be large relative to the gap thickness. This distance should be at least two to three times the gap thickness.

The foregoing, together with other objects, features and advantages of this invention will become more apparent when referring to the following specification, claims and the accompanying drawing.

BRIEF DESCRIPTION OF THE DRAWINGS

For a more complete understanding of this invention, reference is now made to the following detailed description of the embodiments as illustrated in the accompanying drawings, wherein:

FIG. 5, comprising

FIG. 7, comprising

FIG. 9, comprising

DETAILED DESCRIPTION OF THE PREFERRED EMBODIMENTS

Figure 3:
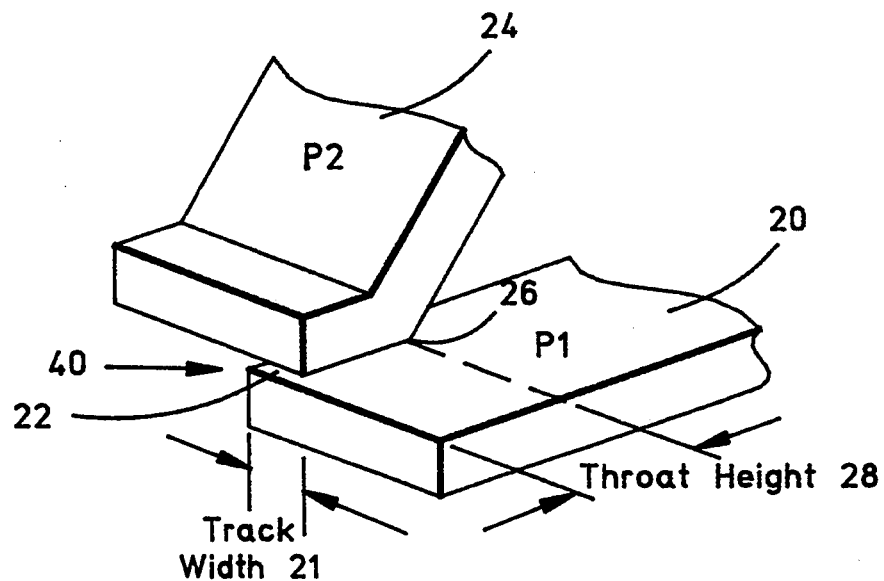
FIG. 3 shows the transverse staggered pole-tip configuration from the prior art.
Figure 4:
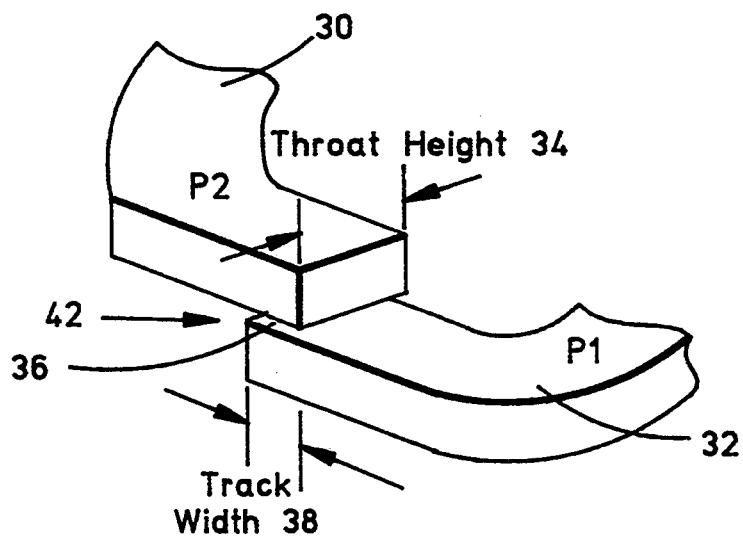
FIG. 4 shows the longitudinal staggered pole-tip configuration from the prior art.
Figure 5A:
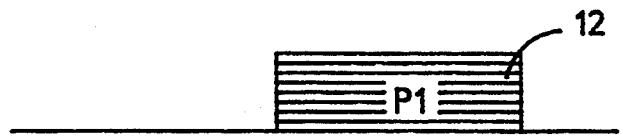
FIGS. 5A–5D, shows a thin film planarization technique known in the prior art.
Figure 5B:
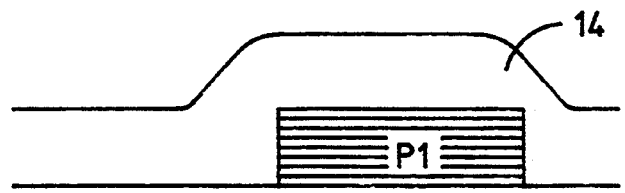
Figure 5C:
Figure 5D:
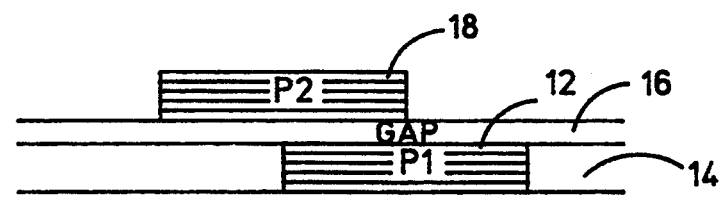

FIGS. 3 and 4 illustrate the transverse and longitudinal staggered pole-tip configurations known in the art. In FIG. 3, lower $P_1$ pole-tip 20 overlaps by a track width 21 to form a recording gap 22 in the region that overlaps with the upper $P_2$ pole-tip 24. Note that the widths of lower pole-tip 20 and upper pole-tip 24 are substantially greater than track width 21 of gap 22. Thus, the transverse staggered pole-tip configuration in FIG. 3 can provide a track width substantially smaller than the width of the thin film pole-tip elements. This extends the usefulness of presently available fabrication resolution to tracking widths smaller than otherwise possible. Upper $P_2$ pole-tip 24 is shown stepped away from lower $P_1$ pole-tip 20 at the rear edge 26 of the throat region. This configuration establishes the throat heighth 28 for gap 22.

FIG. 4 shows a longitudinal variation of the staggered pole-tip configuration from FIG. 3. The upper $P_2$ pole-tip 30 is collinear with the overlapping lower $P_1$ pole tip 32. The overlap between of upper pole-tip 30 and lower pole-tip 32 establishes the throat heighth 34 of the recording gap 36. In a sense, the pole-tip element width and length features in FIG. 4 are interchanged with respect to the same features in FIG. 3. That is, pole-tip element width establishes throat heighth 34 in FIG. 4 but track width 21 in FIG. 3. The overlapping lengths at gap 36 establishes the track width 38 in FIG. 4 but the stepped lengths establish throat heighth 28 in FIG. 3.

Figure 1:
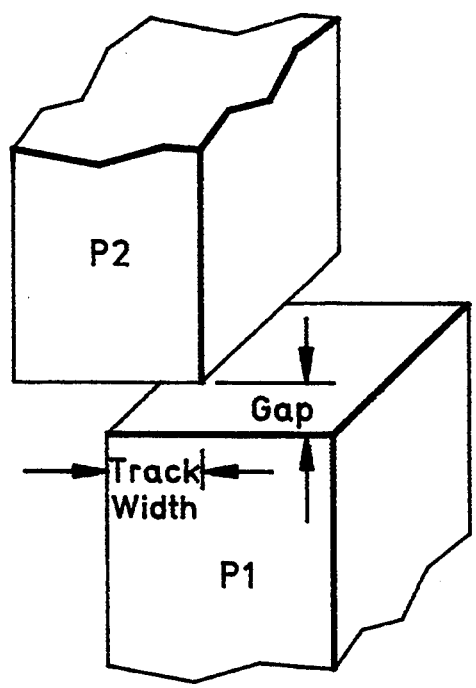
FIG. 1 shows the staggered-pole ferrite head design from the prior art.
Figure 2:
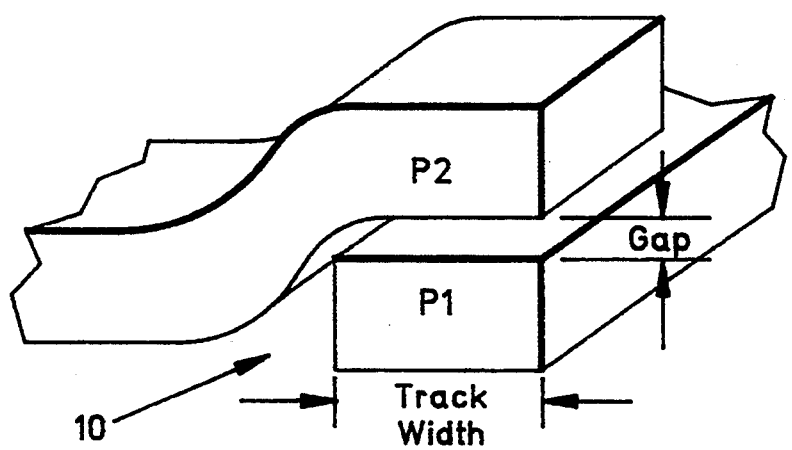
FIG. 2 shows the thin film "wrap-around" staggered pole-tip design from the prior art.

Although neither of the staggered head configurations shown in FIGS. 3–4 has the "wraparound" area 10 seen in FIG. 2, both overlapping pole-tip geometries still exhibit some "side-writing" problems in region 40 (FIG. 3) and region 42 (FIG. 4).

Figure 6:
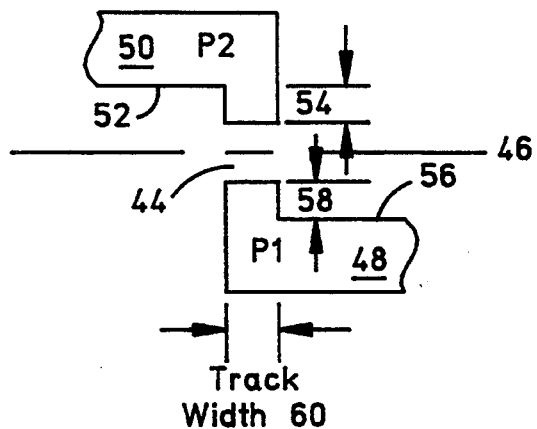
FIG. 6 shows an illustrative ABS view of the stepped staggered self-aligned pole-tip design of this invention.

FIG. 6 shows the air bearing surface (ABS) representation of the stepped pole-tip configuration of this invention. As with the staggered pole-tip configuration known in the art, a recording gap region 44 is formed on a gap centerline 46 by a first pole-tip layer $P_1$ having a side edge 48 disposed on the ABS and a second pole-tip layer $P_2$ having a side edge 50 disposed on the ABS.

An important feature of FIG. 6 is the stepped surface 52 formed in the $P_2$ layer by the step 54 and the stepped surface 56 formed in the $P_1$ layer by the step 58. Note that the separation distances between centerline 46 and stepped surfaces 52 and 56 inside recording gap region 44 are different from the respective distances outside gap region 44. The track width 60 is determined by the overlap in gap region 44. Note that step 54 is shown aligned with the end of pole-tip $P_1$ and step 58 is shown aligned with the end of pole-tip $P_2$. This alignment is preferred because it tends to minimize the side-writing problems that can occur in the step regions. Thus, the designer should reduce the overlap region 44 when reducing track width 60 instead of merely moving steps 54 and 58 closer to the ends of pole-tips $P_1$ and $P_2$. Note in FIG. 6 that steps 54 and 58 are shown as being substantially normal to gap centerline 46 and surfaces 52 and 56. Although this relationship is preferred, it is not particularly necessary to obtain the benefits of the stepped pole-tip of this invention.

Figure 7A:
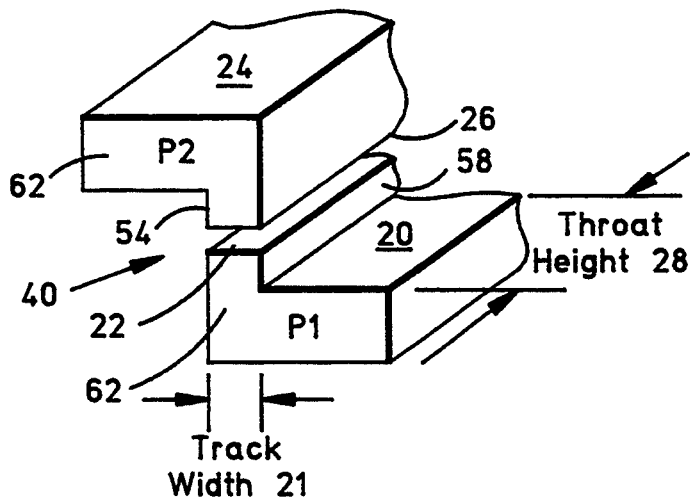
FIGS. 7A–7B, shows two illustrative embodiments of the pole-tip design of FIG. 6.
Figure 7B:
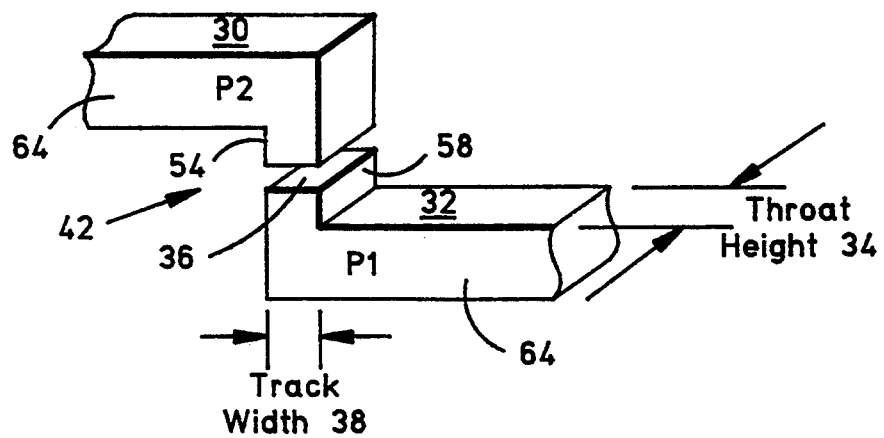

FIG. 7, consisting of FIGS. 7A and 7B, illustrates the application of the stepped pole-tip of this invention to the transverse staggered head (FIG. 3 ) and the longitudinal staggered head {FIG. 4) discussed above. In FIG.

7A, steps 54 and 58 extend rearward into throat region 28 from ABS 62. Similarly, in FIG. 7B, steps 54 and 58 extend rearward from ABS 64 entirely through throat region 34. The illustrative application of the stepped pole-tip of this invention shown in FIG. 7 is preferred because of throat region uniformity and the minimal side-writing effects in the ABS. Steps 54 and 58 are not necessarily equal but each should be at least 2 to 3 times larger than the gap thickness separating pole-tips $P_1$ and $P_2$ in gap region 44 (FIG. 6). Similarly, although steps 54 and 58 extend entirely through throat regions 28 (FIG. 7A) and 34 (FIG. 7B), neither need extend further than 2 to 3 times the thickness of gap 22 (FIG. 7A) or gap 36 (FIG. 7B). The desired benefits of the stepped pole-tip of this invention are not significantly enhanced by increasing the step size or the throat heighth beyond 400% of the gap thickness.

Figure 9A:
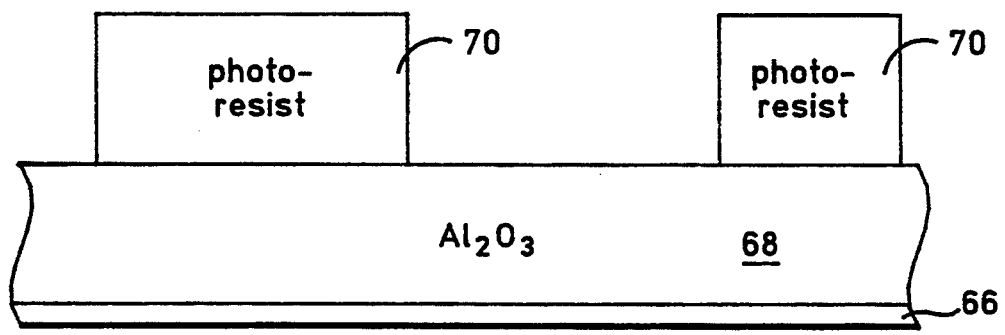
FIGS. 9A–9D, shows an illustrative thin film fabrication process for the pole-tip design of FIG. 6.

FIG. 9, consisting of FIGS. 9A–9D, illustrates a useful thin film fabrication method for producing the stepped pole-tip configuration of this invention. The first step, shown in FIG. 9A, is the depositing of a nonmagnetic seed layer 66, such as Nb. The next step is depositing an insulating layer 68 of nonmagnetic material such as alumina or silica. The thickness of insulating layer 68 should be greater than the combined thickness of the lower $P_1$ pole-tip layer and the gap-forming layer 74 discussed below.

Figure 9B:
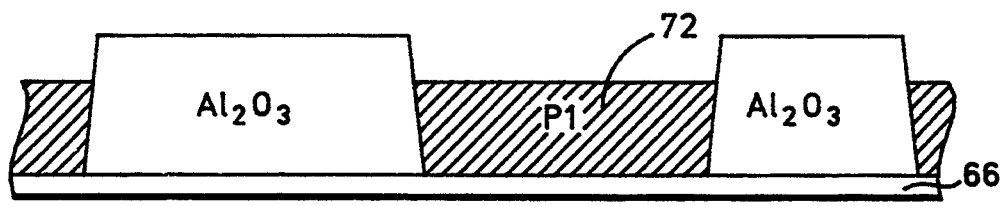

Next, a photoresist masking layer (not shown) is deposited, baked, exposed and etched to form a mask consisting of the mask elements 70 shown in FIG. 9A. Next, insulating layer 68 is etched through mask 70 until seed layer 66 is exposed (FIG. 9B). The remainder of insulating layer 68 is then used as a plating frame to plate the lower $P_1$ pole-tip layer 72. The excess ferromagnetic $P_1$ pole-tip material is removed as in a conventional frame plating process, leaving $P_1$ element 72 as shown in FIG. 9B.

Figure 9C:
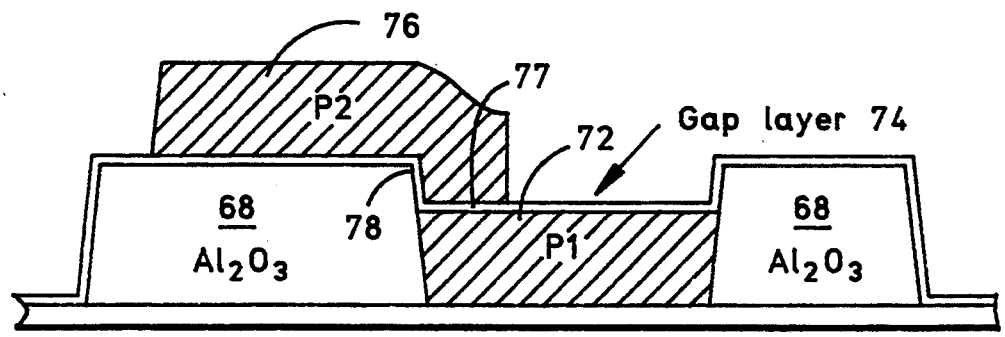

Gap-forming layer 74 is then deposited over the entire surface, using any useful gap material such as alumina or silica. Subsequently, the upper $P_2$ pole-tip layer 76 is plated in any useful manner known in the art, as shown in FIG. 9C. Lower pole-tip 72 and upper pole-tip 76 are overlapped as shown to form the recording gap 77. Moreover, a step 78 is introduced in upper pole-tip 76 by the excess heighth in insulating layer 68 at the overlap region. The heighth of step 78 can be controlled by controlling the thicknesses of lower pole-tip layer 72 with respect to the thicknesses of insulating layer 68 and gap-forming layer 74.

Figure 9D:
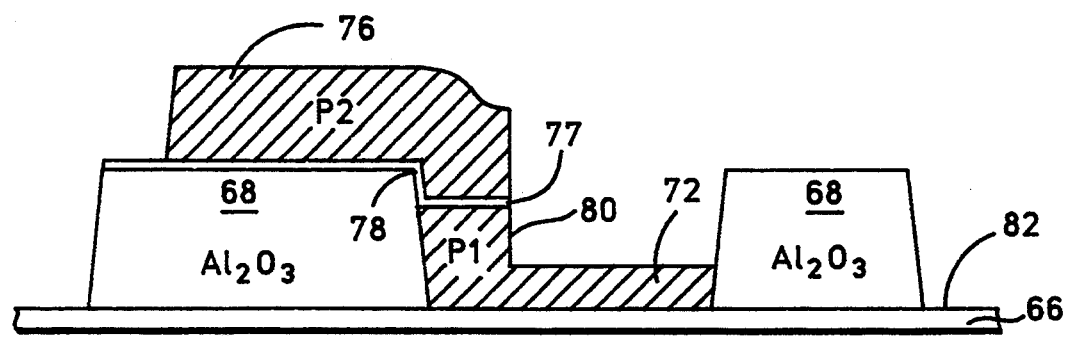

The final procedure necessary to reveal the lower stepped pole-tip of this invention is to ion-mill a step 80 in lower pole-tip 72 using upper pole-tip 76 as a self-aligning mask. The results of this self-aligning ion-milling procedure are shown in FIG. 9D. A photoresist mask (not shown) may be appropriately used here to limit the depth of the throat region (not shown in FIG. 9D but e.g., see throat region 28 in FIG. 7A) over which step 78 is etched.

Figure 8:
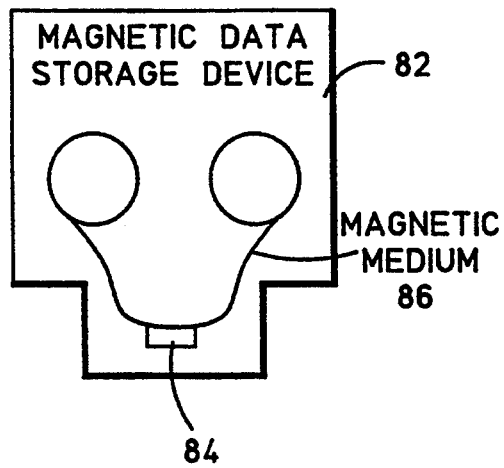
FIG. 8 shows an illustrative embodiment of a magnetic data storage device employing the pole-tip design of this invention.

FIG. 8 shows a schematic representation of a magnetic data storage device 82 having a magnetic head 84 that employs the stepped pole-tip of this invention. Magnetic head 84 is used to read and write magnetic data signals onto the magnetic medium 86, which is illustratively represented in FIG. 8 as magnetic tape.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A thin film magnetic head comprising:
    an air bearing surface (ABS) for contacting a magnetic storage medium;
    a transducing gap formed between pole-tip surfaces separated by a gap distance;
    a gap centerplane intersecting said ABS at a gap centerline and extending into said head from said ABS;
    a recording gap region disposed in said gap centerplane, said recording gap region extending over a gap width along said gap centerline and extending from said ABS into said head over a throat height disposed substantially normal to said gap centerline;
    a first pole-tip layer of ferromagnetic material disposed on one side of said gap centerplane and having a first stepped surface disposed facing said gap centerplane and separated therefrom within said recording gap region by a half-gap distance and elsewhere separated from said gap centerplane by a first step distance substantially greater than said half-gap distance; and
    a second pole-tip layer of ferromagnetic material disposed on the other side of said gap centerplane overlapping said first pole-tip layer and having a second stepped surface disposed facing said gap centerplane and separated therefrom within said recording gap region by said half-gap distance and elsewhere separated from said gap centerplane by a second step distance substantially greater than said half-gap distance.

2. The magnetic head of claim 1 wherein:
    said first pole-tip layer overlaps said second pole-tip layer only in said recording gap region, thereby forming a staggered pole head.

3. The magnetic head of claim 2 wherein:
    said throat height exceeds 400% of said half-gap distance.

4. The magnetic head of claim 3 wherein:
    said first step distance is greater than 500% of said half-gap distance.

5. The magnetic head of claim 4 wherein:
    said second step distance is greater than 500% of said half-gap distance.

6. The magnetic head of claim 1 wherein: said throat height exceeds 400% of said half-gap distance.

7. The magnetic head of claim 1 wherein:
    said first step distance is greater than 500% of said half-gap distance.

8. The magnetic head of claim 7 wherein:
    said second step distance is greater than 500% of said half-gap distance.

9. The magnetic head of claim 1 wherein:
    said first stepped surface includes a step that is substantially normal to said gap centerplane.

10. The magnetic head of claim 9 wherein:
    said second stepped surface includes a step that is substantially normal to said gap centerplane.

11. A magnetic data storage device for storing data in and retrieving data from a magnetic medium, said device having at least one thin film magnetic head, said magnetic thin film head comprising:
    an air bearing surface (ABS) for contacting a magnetic storage medium;

a transducing gap formed between pole-tip surfaces separated by a gap distance;

a gap centerplane intersecting said ABS at a gap centerline and extending into said head from said ABS;

a recording gap region disposed in said gap centerplane, said recording gap region extending over a gap width along said gap centerline and extending from said ABS into said head over a throat height disposed substantially normal to said gap centerline;

a first pole-tip layer of ferromagnetic material disposed on one side of said gap centerplane and having a first stepped surface disposed facing said gap centerplane and separated therefrom within said recording gap region by a half-gap distance and elsewhere separated from said gap centerplane by a first step distance substantially greater than said half-gap distance; and a second pole-tip layer of ferromagnetic material disposed on the other side of said gap centerplane overlapping said first pole-tip layer and having a second stepped surface disposed facing said gap centerplane and separated therefrom within said recording gap region by said half-gap distance and elsewhere separated from said gap centerplane by a second step distance substantially greater than said half-gap distance.

12. The magnetic data storage device of claim 11 wherein:

said first pole-tip layer overlaps said second pole-tip layer only in said recording gap region, thereby forming a staggered pole head.

13. The magnetic data storage device of claim 12 wherein:

said throat height exceeds 400% of said half-gap distance.

14. The magnetic data storage device of claim 13 wherein:

said first step distance is greater than 500% of said half-gap distance.

15. The magnetic data storage device of claim 14 wherein:

said second step distance is greater than 500% of said half-gap distance.

16. The magnetic data storage device of claim 11 wherein:

said throat height exceeds 400% of said half-gap distance.

17. The magnetic data storage device of claim 11 wherein:

said first step distance is greater than 500% of said half-gap distance.

18. The magnetic data storage device of claim 17 wherein:

said second step distance is greater than 500% of said half-gap distance.

19. The magnetic data storage device of claim 11 wherein:

said first stepped surface includes a step that is substantially normal to said gap centerplane.

20. The magnetic data storage device of claim 19 wherein:

said second stepped surface includes a step that is substantially normal to said gap centerplane.

* * * * *